(12) United States Patent
Sloane et al.

(10) Patent No.: US 7,360,523 B2
(45) Date of Patent: Apr. 22, 2008

(54) METHOD AND APPARATUS TO CONTROL OPERATION OF A HOMOGENEOUS CHARGE COMPRESSION-IGNITION ENGINE

(75) Inventors: Thompson M. Sloane, Oxford, MI (US); Tang-Wei Kuo, Troy, MI (US); Jun-Mo Kang, Ann Arbor, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/749,903

(22) Filed: May 17, 2007

(65) Prior Publication Data

US 2007/0272203 A1 Nov. 29, 2007

Related U.S. Application Data

(60) Provisional application No. 60/808,358, filed on May 25, 2006.

(51) Int. Cl.
*F02B 1/10* (2006.01)
*F02B 1/14* (2006.01)
*F02M 25/07* (2006.01)
*F01L 1/34* (2006.01)

(52) U.S. Cl. ............... 123/305; 123/90.15; 123/294; 123/568.21

(58) Field of Classification Search .. 123/90.15–90.17, 123/294, 305, 435, 568.21
See application file for complete search history.

(56) References Cited

U.S. PATENT DOCUMENTS

| | | | |
|---|---|---|---|
| 6,662,785 B1 | 12/2003 | Sloane et al. | |
| 6,840,237 B2 * | 1/2005 | Strom et al. | 123/684 |
| 7,000,586 B2 | 2/2006 | Kato et al. | |
| 7,021,277 B2 * | 4/2006 | Kuo et al. | 123/90.15 |
| 7,059,296 B2 * | 6/2006 | Strom et al. | 123/305 |

* cited by examiner

*Primary Examiner*—T. M. Argenbright

(57) ABSTRACT

The invention provides a method for operating a multi-cylinder, spark-ignition, direct-injection, four-stroke internal-combustion engine adapted to operate in a controlled auto-ignition mode selectively operative at stoichiometry and lean of stoichiometry. The method comprises adapting an engine valve actuation system to control engine valve opening and closing, and monitoring engine operating conditions and ambient barometric pressure. The engine is operated unthrottled and the engine valve actuation system is controlled to effect a negative valve overlap period when the engine operating conditions are within predetermined ranges. A mass of fuel is injected during the negative valve overlap period. The magnitude of the negative valve overlap period is decreased with decreasing ambient pressure and increased with increasing ambient pressure.

20 Claims, 3 Drawing Sheets

METHOD AND APPARATUS TO CONTROL OPERATION OF A HOMOGENEOUS CHARGE COMPRESSION-IGNITION ENGINE

CROSS REFERENCE TO RELATED APPLICATIONS

This application claims priority from U.S. Provisional Application No. 60/808,358, filed May 25, 2006, which is hereby incorporated herein by reference.

TECHNICAL FIELD

This invention pertains generally to internal combustion engine control systems, and more specifically to a method and apparatus to control operation of a homogeneous-charge compression-ignition engine.

BACKGROUND OF THE INVENTION

The statements in this section merely provide background information related to the present disclosure and may not constitute prior art.

Internal combustion engines, especially automotive internal combustion engines, generally fall into one of two categories, spark-ignition engines and compression-ignition engines. Conventional spark-ignition engines, such as gasoline engines, typically function by introducing a fuel/air mixture into the combustion cylinders, which is then compressed in the compression stroke and ignited by a spark plug. Conventional compression-ignition engines, such as diesel engines, typically function by introducing or injecting pressurized fuel into a combustion cylinder near top dead center (TDC) of the compression stroke, which ignites upon injection. Combustion for both conventional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One such engine system comprises an internal combustion engine designed to operate in a controlled auto-ignition mode under specific engine operating conditions to achieve improved engine fuel efficiency, also referred to as homogeneous charge compression-ignition (HCCI) combustion mode. A spark-ignition system is employed to supplement the auto-ignition combustion process during specific operating conditions.

A typical HCCI engine operates in either the controlled auto-ignition combustion mode or the spark-ignition mode depending upon the engine speed and load. The HCCI combustion mode comprises a distributed, flameless, auto-ignition combustion process that is controlled by oxidation chemistry, rather than by fluid mechanics. Ignition of a cylinder charge is caused by compression of the cylinder charge under specific engine operating conditions. In the typical engine operating in HCCI combustion mode, the cylinder charge is nearly homogeneous in composition, temperature, and residual level at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low NOx emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. Furthermore, the HCCI engine can operate at stoichiometry with substantial amounts of EGR to achieve effective combustion. At medium engine speeds and loads, a combination of engine valve profile and timing (e.g., exhaust recompression and exhaust re-breathing) and fueling strategy has been found to be effective in providing adequate thermal energy to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise is achieved over a range of operating conditions.

There is no direct control of start of combustion for an engine operating in the auto-ignition mode, as the chemical kinetics of the cylinder charge determine the start and course of the combustion. At engine operating conditions above certain limits, the HCCI engine transitions to spark-ignition combustion, at stoichiometry, in order to achieve stable combustion, manage emissions, and meet an operator torque request. The typical HCCI engine transitions between HCCI combustion mode and spark-ignition (SI) combustion mode, depending upon precalibrated and predetermined operating conditions. Often, the SI mode includes operating un-throttled at a stoichiometric air/fuel ratio.

When operating at sea-level, a HCCI engine having a two-step lift, dual variable cam phaser valve actuation system uses low-lift valve opening for unthrottled low- and medium-load HCCI operation, and uses the high-lift valve opening at high loads for operation, similar to a conventional spark-ignited engine. Combustion timing control for the engine in HCCI mode typically includes using negative valve overlap (NVO), comprising a period during each engine cycle wherein an exhaust valve closes prior to opening of an intake valve, measured in crank angle degrees, to reform a portion of the fuel to facilitate auto-ignition combustion.

Combustion timing is controlled using timing of fuel injection, including amount and timing of fuel injected during the NVO period and during the intake and compression strokes. The duration of the NVO period can also be used to control combustion timing. Spark-assist can further control combustion timing. Two HCCI operating ranges are used: lean unthrottled operation at lower loads, where the NOx emissions are below 1.0 g/kg fuel, and unthrottled stoichiometric operation at higher loads with external exhaust gas recirculation (EGR) to allow NOx reduction with a three-way stoichiometric catalytic converter and to control engine combustion noise.

In the lean HCCI operating mode, the combustion is advanced or retarded by increasing or decreasing the NVO, respectively. If further combustion advance is required in addition to that provided by NVO, the amount of fuel injected during the period of negative valve overlap is increased, and the timing of this fuel injection and the fuel injection during the compression stroke is adjusted. Combustion noise is typically not a problem in this operating regime, so external EGR is generally not needed to control noise.

In the unthrottled stoichiometric HCCI operating mode, satisfactory ignition timing and acceptable engine noise must be simultaneously achieved. As the fueling rate is increased, sufficient quantity of air must be inducted into each engine cylinder for an air-fuel ratio of stoichiometry. In addition, the amount of dilution must be sufficient to maintain the engine noise at an acceptable level. Due to conductance limitations of the low-lift valve opening, there is a maximum fueling rate above which sufficient air to provide stoichiometric air-fuel ratio and/or sufficient external EGR to maintain acceptable engine noise cannot be inducted into the engine cylinder. This defines an upper load limit for HCCI operation of the engine.

As ambient altitude increases, the intake and exhaust pressures decrease, leading to an advance in the combustion timing. Because an engine operating in HCCI combustion mode does not rely on either spark ignition or fuel injection timing to directly control the combustion process or ignition timing, typically the HCCI engine requires unique control strategies. In particular, it is advantageous to have a control system for an internal combustion engine using a controlled auto-ignition process which accommodates changes in ambient pressure due to changes in altitude or other barometric conditions. Such a control system is described herein.

SUMMARY OF THE INVENTION

In accordance with the present invention, there is provided a method for operating a multi-cylinder, spark-ignition, direct-injection, four-stroke internal-combustion engine adapted to operate in a controlled auto-ignition mode selectively operative at stoichiometry and lean of stoichiometry. The method comprises adapting an engine valve actuation system to control engine valve opening and closing, and monitoring engine operating conditions and ambient barometric pressure. The engine is operated unthrottled and the engine valve actuation system is controlled to effect a negative valve overlap period when the engine operating conditions are within predetermined ranges. A mass of fuel is injected during the negative valve overlap period. The magnitude of the negative valve overlap period is decreased with decreasing ambient pressure and increased the magnitude of the negative valve overlap period with increasing ambient pressure.

BRIEF DESCRIPTION OF THE DRAWINGS

The invention may take physical form in certain parts and arrangement of parts, the preferred embodiment of which will be described in detail and illustrated in the drawings incorporated hereinafter, comprising.

DESCRIPTION OF THE PREFERRED EMBODIMENT

Figure 1:
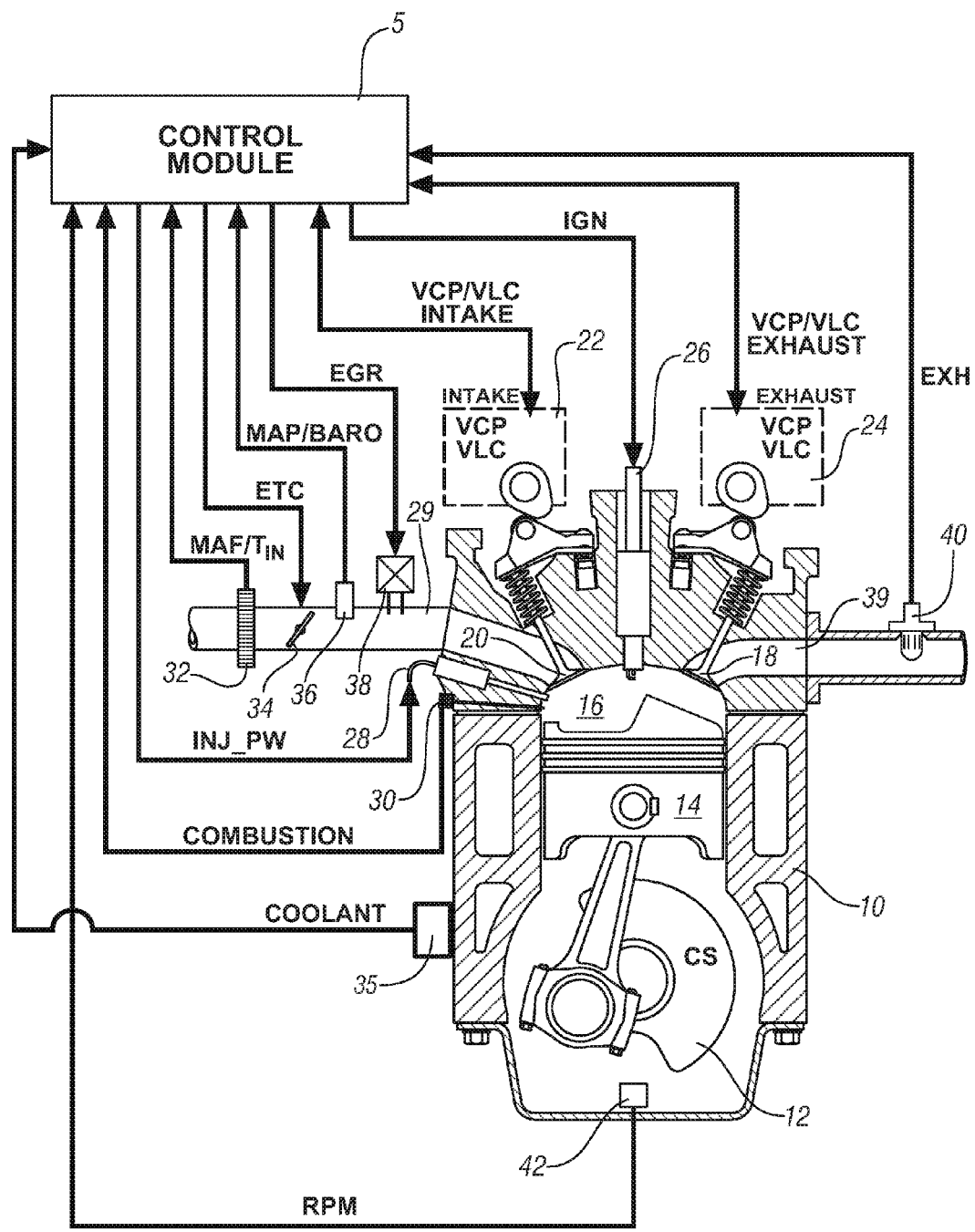
FIG. 1 is a schematic illustration of an internal combustion engine, in accordance with the present invention.

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake runner 29 to each combustion chamber 16. The air intake system comprises airflow ductwork and devices for monitoring and controlling the air flow. The devices preferably include a mass airflow sensor 32 for monitoring mass airflow ('MAF') and intake air temperature ('Tin'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and ambient barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve. As used herein, the term 'cylinder structure' refers to the engine components and elements which form each combustion chamber, i.e., walls of cylinder, piston, and head, including intake and exhaust valves.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling phasing, lift and duration of openings of the intake and the exhaust valves, preferably using variable lift control ('VLC') and variable cam phasing ('VCP') systems. The variable valve lift system comprises devices operative to control valve lift, or opening, to one of two distinct steps, comprising a low-lift valve opening (about 3-6 mm) for an open duration of 120-150 crank angle degrees at low speed, low load operation, and a high-lift valve opening (about 8-10 mm) for an open duration of 220-260 crank angle degrees at high speed, high load operation.

The VCP systems are operable to shift valve opening and closing times relative to crankshaft and piston position, i.e., phasing, beyond that which is effected by the two-step VLC lift is depicted with reference to FIG. 1. There is a VCP/VLC system 22 for the engine intake and a VCP/VLC system 24 for the engine exhaust. The VCP/VLC systems 22, 24 are controlled by the control module 5, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used.

As known to skilled practitioners, VCP/VLC systems have a limited range of authority over which opening and closings of the intake and exhaust valves is controlled. The typical VCP system has a range of phasing authority of 30°-90° of cam shaft rotation, thus permitting the control module to advance or retard opening and closing of the engine valves. The range of phasing authority is defined and limited by the hardware of the VCP and the control system which actuates the VCP. The VCP/VLC systems are actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to an engine control signal ('inj_pw') from the control module. The fuel injectors 28 are supplied pressurized fuel from a fuel distribution system (not shown).

The engine includes a spark-ignition system by which spark energy is provided to a spark plug 26 for igniting or assisting in igniting cylinder charges in each of the combustion chambers, in response to an engine control signal ('IGN') from the control module. The spark plug 26 enhances the ignition timing control of the cylinder charge under certain operating conditions (e.g., during cold start, near a low load operation limit, and during ordinary SI engine combustion operation).

The engine is preferably equipped with various sensing devices for monitoring engine operating states, including a crankshaft rotational speed sensor 42 having output RPM, a sensor 30 adapted to monitor combustion having output COMBUSTION, a sensor 40 adapted to monitor exhaust gases having output EXH, typically a wide range air/fuel ratio sensor, and a coolant sensor 35 having output 'COOLANT'. In systems so equipped, the combustion sensor comprises a sensor device operative to monitor a combustion parameter, depicted as a cylinder pressure sensor adapted to monitor in-cylinder combustion pressure. It is understood that other sensing systems used to monitor cylinder pressure or another combustion parameter which is translated into combustion phasing are included within the scope of the invention, e.g., ion-sense ignition systems. It is understood that other methods for determining a combustion parameter may be used, within the scope of the invention.

The engine is designed to operate un-throttled on gasoline or similar fuel blends with auto-ignition combustion ('HCCI combustion') over an extended range of engine speeds and loads. The engine operates in the spark-ignition combustion mode with controlled throttle operation with conventional or modified control methods under conditions not conducive to the auto-ignition combustion and to attain maximum engine power to meet an operator torque request (To_req). Widely available grades of gasoline and light ethanol blends thereof are preferred fuels; however, alternative liquid and gaseous fuels such as higher ethanol blends (e.g., E80, E85), neat ethanol (E99), neat methanol (M100), butanol gasoline blends, neat butanol, natural gas, hydrogen, biogas, various reformates, syngases, and others may be used in the implementation of the present invention.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

The control module 5 executes algorithmic code stored therein to control the aforementioned actuators to specific control states to control the engine operation, including: throttle position (ETC); spark timing and dwell (IGN); fuel injection mass and timing (INJ_PW); phasing, lift and duration of openings of the intake and/or exhaust valves (VCP/VLC); and, EGR valve position (EGR) to control flow of recirculated exhaust gases. The phasing, lift and duration of openings of the intake and/or exhaust valves includes NVO in an exhaust recompression strategy, and lift of exhaust valve reopening in an exhaust re-breathing strategy. The control module is adapted to monitor input signals from the operator (e.g., an accelerator pedal position and a brake pedal position) to determine the operator torque request (To_req), and adapted to monitor engine operating states from sensors, including those indicating engine speed (RPM), engine load (using MAF, MAP, or INJ_PW), combustion, coolant temperature (COOLANT), intake air temperature (Tin) and other ambient conditions to determine an engine operating point, primarily related to engine speed and load.

The control module 5 operates to determine control states for various engine actuators, including the engine valve actuation phasing, lift, duration (VCP/VLC Intake, VCP/VLC Exhaust), fuel injection timing and pulsewidth (INJ_PW) including multiple injections per cycle, spark timing and dwell (IGN), EGR valve position (EGR), and throttle position (ETC), from predetermined lookup tables and equations stored in memory, as will be described hereinafter. The control module is operative to monitor torque or load and engine speed from which engine power is calculated.

Figure 2:
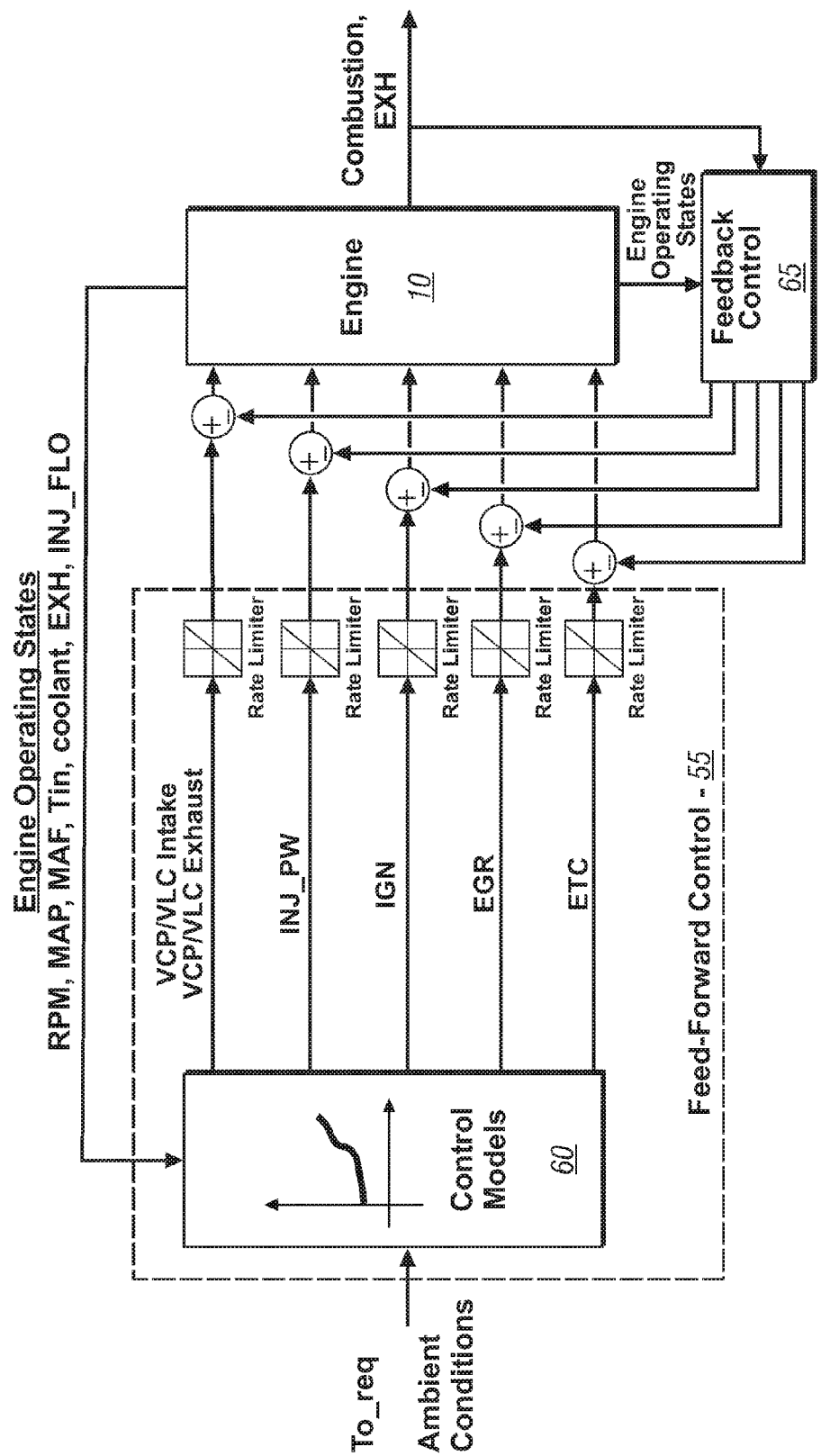
FIG. 2 is a schematic block diagram of an engine control subsystem, in accordance with the present invention; and, FIGS. 3A and 3B are data graphs, in accordance with the present invention.

Referring now to FIG. 2, details of controlling and operating the engine in auto-ignition combustion mode, in accordance with the invention are depicted. The engine control subsystem preferably consists of algorithmic code and calibration tables stored in one of the memory devices of the engine control module 5 for execution therein. The engine control subsystem synthesizes the operator inputs, ambient conditions, engine operating states, and combustion performance measurements, and executes algorithms to determine preferred control states of various actuators to meet the operator torque request and achieve targets for engine operation. The combustion performance measurements ('COMBUSTION') are preferably translatable to measures of ignition timing and burn duration occurring during controlled auto-ignition combustion. Ignition timing of controlled auto-ignition combustion is defined as the crank angle position, measured in degrees after top-dead-center ('deg aTDC') at which 10% and 50% of the mass fraction of the combustion chamber charge is burned ('CA10' and 'CA50', respectively). Burn duration of combustion is defined as the crank angle interval, in crank angle degrees ('CAD') between 10 and 90% mass fraction burned.

The engine control subsystem includes the feedforward control scheme 55 and, preferably, a feedback control scheme 65. The engine control subsystem is preferably executed as part of ongoing engine control to achieve a rapid and effective system response to changes of operating conditions, typically in response to changes in the operator inputs and ambient conditions.

The feedforward control scheme 55 comprises two major elements: a control model 60, comprising precalibrated look-up tables and algorithms, and a plurality rate limiters. The precalibrated look-up tables and algorithms of the control model comprise machine-searchable arrays stored in one of the memory devices and machine-executable algorithms to determine control states for each of the engine control actuators, based upon the engine operating states, e.g., engine speed, load, intake temperature, coolant temperature, exhaust, and effective temperature of the cylinder structure. An engine operating point is determined based upon the engine speed and load.

A specific control state for each of the actuators is determined based upon the engine operating states, and the engine power history. The control states for each of the engine control actuators comprise actuator-appropriate command signals to control operation of the actuators. The outputs from the lookup tables are passed through one of a plurality of feed-forward rate-limiters, as depicted.

Overall, the invention comprises a method for operating the engine in auto-ignition combustion mode, at either stoichiometry or lean of stoichiometry. It comprises monitoring engine operating conditions, especially speed and load, and ambient pressure, typically using the BARO output from sensor 36. The engine is operated unthrottled with a negative valve overlap period when the engine operating conditions are within predetermined ranges. A mass of fuel is injected during the negative valve overlap period. The magnitude of the negative valve overlap period is decreased with decreasing ambient pressure, and increased with increasing ambient pressure. The engine preferably operates in the controlled auto-ignition mode at stoichiometry when the engine operating conditions comprise high load and the engine is at high altitudes, limited by an upper load range.

The method for operating the exemplary HCCI engine having the two-step valve lift, dual cam phaser valve actuation system at sea-level comprises using the low-lift valve step unthrottled in auto-ignition operating mode, and using the high-lift valve step at high engine loads when operating the engine in the spark-ignition mode. Control of the combustion timing for the engine in the auto-ignition mode involves the control of the NVO period. Combustion timing is controlled by controlling NVO and fuel injection, including controlling amount and timing of fuel injected during each NVO period, and during each intake and each compression stroke. Ignition spark-assist is selectively used to control combustion timing.

Two auto-ignition combustion operating modes are preferably used, including the lean operating mode (Lean HCCI) and the stoichiometric operating mode (Stoich HCCI). The lean HCCI operating mode comprises operating the engine unthrottled and at an air/fuel ratio lean of stoichiometry, typically at lower engine loads, and preferably wherein NOx emissions are below 1.0 g/kg fuel. The Stoich HCCI operating mode comprises operating the engine unthrottled and at a stoichiometric air/fuel ratio, typically at higher engine loads. Control of external exhaust gas recirculation (EGR) is employed in this mode to effect NOx reduction in a three-way stoichiometric catalytic converter, and to control engine combustion noise.

In the lean HCCI operating mode, combustion is advanced or retarded by respectively increasing or decreasing the magnitude of the NVO. At operating conditions where further combustion advance is required in addition to that provided by NVO, the amount of fuel injected during the period of negative valve overlap is increased, and the timing of the fuel injection and the fuel injection during the compression stroke are adjusted. Combustion noise is typically not a problem in this operating regime, and external EGR is not needed to control noise.

Operation in the Stoich HCCI operating mode is limited based upon satisfactory ignition timing and acceptable engine noise. In operation, fueling rate is increased in order to increase engine load. As the fueling rate increases, a corresponding mass of air must be inducted into the engine cylinder to maintain stoichiometric operation. In addition, the amount of exhaust gas dilution must be sufficient to maintain the engine noise at an acceptable level. An upper limit for HCCI operation, i.e., in the Stoich HCCI operating mode, is defined by flow limitations of the low valve lift. At a demand fuel flow rate greater than the maximum flow capacity of the intake valve, divided by the stoichiometric air/fuel ratio, there is insufficient air flow to maintain stoichiometry and sufficient EGR for acceptable engine noise levels. In this condition, HCCI operation is discontinued and the engine is operated in spark-ignition mode, with spark timing and dwell controlling ignition of the cylinder charge. The method for running the exemplary HCCI engine at high altitudes or low atmospheric pressure is now described. Timing of combustion advances as the altitude increases and the intake and exhaust pressures decrease.

Figure 3A:
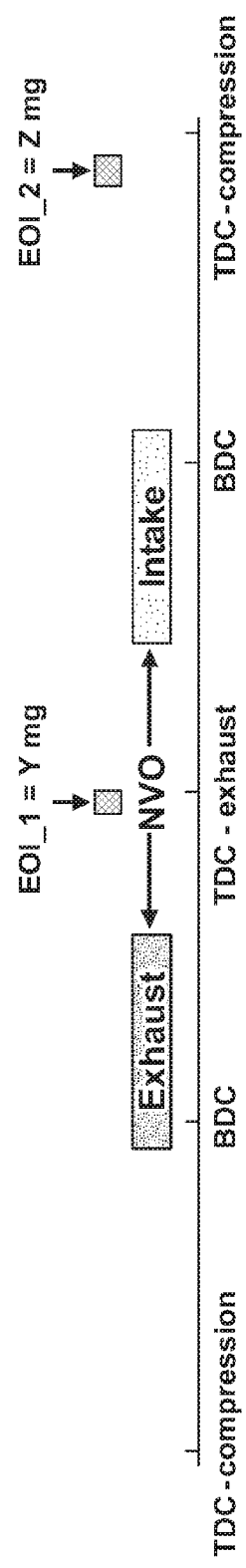
Figure 3B:
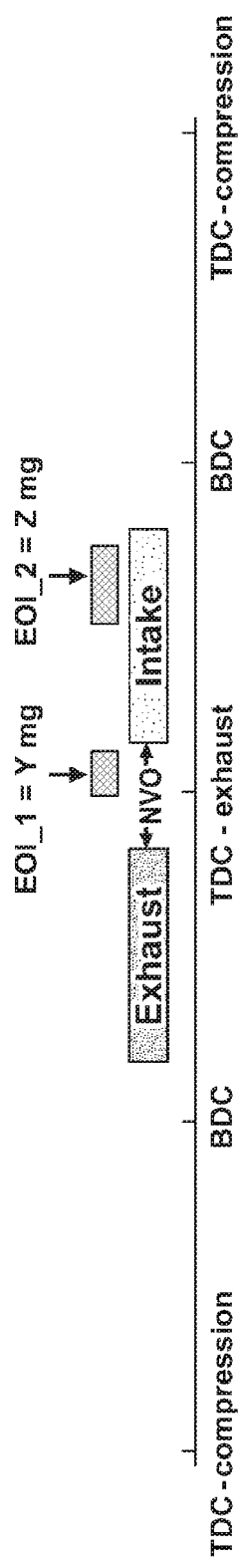

Referring now to FIGS. 3A and 3B, timing charts for engine valve and fuel injection are depicted for operating the exemplary engine under specific conditions. The axis is shown in crank angle degrees with specific positions of top-dead-center ('TDC') compression, bottom-dead-center ('BDC'), and TDC-Exhaust. The area depicted as 'exhaust' represents an elapsed period during which the exhaust valve 18 is opened, and the area depicted as 'intake' comprises an elapsed period during which the intake valve 20 is opened. The area therebetween, shown as 'NVO' represents an elapsed period of negative valve overlap. Referring now to FIG. 3A, the timing chart depicts operating the exemplary engine under specific conditions of light load, in the lean HCCI operating mode at sea-level altitude with NVO. Fueling from the fuel injector 28 during the NVO period is represented EOI_1, depicted as a mass flow of Y milligrams (mg). Fueling from the fuel injector 28 during the intake and compression period is represented as EOI_2, shown as a mass flow of Z milligrams (mg). An advance in combustion timing due to an increase in altitude or decrease in atmospheric pressure is compensated in the lean HCCI operating mode by decreasing the NVO period and/or decreasing the amount of fuel injected during the NVO period (EIO_1), which affects quantity of reformed fuel. Decreasing the NVO period maintains the combustion timing at an optimum level as atmospheric pressure decreases. A retard in combustion timing due to an increase in atmospheric pressure is preferably compensated in the lean HCCI operating mode by increasing the NVO period and/or injecting more fuel during the NVO period to maintain the combustion timing at its optimum level.

Referring now to FIG. 3B, the timing chart depicts operating the exemplary engine under specific conditions of high load in the Stoich HCCI operating mode at sea-level altitude with NVO. Fueling from the fuel injector 28 during the NVO period is represented as EOI_1, shown as a mass flow of Y milligrams (mg). Fueling from the fuel injector 28 during the intake and compression period is represented as EOI_2, shown as a mass flow of Z milligrams (mg).

An advance in combustion timing due to an increase in altitude or decrease in atmospheric pressure is compensated in the Stoich HCCI operating mode by decreasing the NVO period and adjusting the amount of fuel injected during the NVO period (EIO_1), which affects quantity of reformed fuel. However, as the atmospheric pressure decreases it is necessary to continue to permit both an adequate amount of air and an adequate amount of charge dilution, including external and internal EGR, to enter each engine cylinder. The air flow and EGR requirements may necessitate a decrease in NVO, resulting in retarding the ignition timing to a greater extent than that necessary to restore optimum combustion timing, due to the decrease in atmospheric pressure. The control system operates by adjusting the amount of reforming fuel and/or spark assisted combustion to restore optimum ignition timing. The magnitude of fuel injected during the NVO period is adjusted with varying altitude or atmospheric pressure. Specific values of quantity of reforming fuel injected and changes in the NVO period are application-specific and preferably determined during preproduction engine development activities.

The upper load limit of the Stoich HCCI operating mode is reduced with increased altitude or decreasing atmospheric pressure. In this case, the maximum amount of fuel that is injected into the engine cylinder must decrease in order to maintain a stoichiometric air-fuel ratio and at the same time maintain adequate charge dilution to achieve acceptable engine noise.

The strategy is now detailed for operating conditions of the maximum engine operating range, typically engine load, within which the engine is effectively operated in the Stoich HCCI operating mode, and a typical low engine load. Near the maximum engine operating load in Stoich HCCI operation, the engine is run unthrottled, i.e., at wide-open throttle. At this condition, satisfactory ignition timing and acceptable engine noise are required to be met simultaneously. As the fueling rate is increased, a sufficient amount of air must be inducted into the engine cylinder to maintain stoichiometric air-fuel ratio operation. In addition, the amount of dilution must be sufficient to maintain the engine noise at an acceptable level. Due to the conductance limitation of the intake system, there is a maximum fueling rate above which sufficient mass of air to maintain stoichiometric air-fuel ratio and/or sufficient mass of external EGR to maintain acceptable engine noise cannot be inducted into the engine cylinder. This defines the upper load limit for HCCI operation of the engine. At sea level, this upper load limit corresponds to a maximum fueling rate.

When the altitude increases with corresponding decrease in the intake and exhaust pressures, timing of combustion advances. However, as the altitude increases it is necessary to continue to permit both an adequate amount of air and an adequate amount of charge dilution, including external and internal EGR, to enter the engine cylinder. The air and EGR requirements necessitate a decrease in NVO that may retard the ignition timing to a greater extent than that necessary to restore optimum combustion timing due to the increase in altitude. An adequate amount of reforming fuel and/or spark assisted combustion is needed in order to restore optimum ignition timing. As the altitude decreases, the opposite approach is taken.

This operation strategy takes into account the increase in noise and NOx as altitude increases at the same fueling rate. In order to maintain the same level of noise as at sea level, the maximum fueling rate for HCCI operation is reduced as the altitude increases.

At low load, combustion also advances as the atmospheric pressure decreases. The advanced combustion timing is compensated by decreasing the NVO and/or decreasing the amount of fuel injected during the negative valve overlap period (reforming fuel). This restores the combustion timing to the optimum level as the altitude of engine operation is increased. As the altitude decreases, combustion tends to retard, so more NVO and/or more fuel injected during the negative valve overlap period will restore the combustion timing to its optimum level.

In order to understand the concept of the invention, a series of engine modeling calculations were executed over various operating conditions to demonstrate operating requirements for the exemplary engine described herein above, at sea level and at high altitude, using a known engine mathematical model. Referring now to Tables 1 and 2, there are provided results of operating an engine at sea level and at high altitude under low load conditions, in accordance with the invention described. Table 1 depicts results of operating under the same fueling conditions at low and high altitude, whereas Table 2 depicts results for operating at low altitude, and at high altitude with reduced fueling during the main, second injection. This demonstrates that at lower loads in lean HCCI operation, ignitability of the fuel charge improves with increased altitude. Furthermore, there is a need to decrease the magnitude of NVO and decrease mass of reforming fuel to maintain optimum combustion timing.

TABLE 1

| NVO = 184 CAD<br>1 mg/5 mg split injection | Sea Level<br>Pin = 0.95 bar | High Altitude<br>Pin = 0.82 bar |
|---|---|---|
| Equivalence Ratio | 0.72 | 0.88 |
| Residual, mass % | 52 | 60 |
| NMEP, bar | 1.42 | 1.61 |
| T @ IVC, K | 526 | 560 |
| P @ IVC, bar | 1.07 | 0.88 |
| CA10 (deg, aTDC) | −3.3 | −6.6 |
| CA50 (deg, aTDC) | 4.1 | −1.6 |
| Main Energy Release, J | 187 | 226.6 |
| Recompression Energy Release, J | 58.9 | 40.0 |

TABLE 2

| NVO = 184 CAD<br>Intake Pressure (BARO)<br>Fuel Injection | Sea Level<br>Pin = 0.95 bar<br>1 mg/5 mg | High Altitude<br>Pin = 0.82 bar<br>1 mg/4 mg |
|---|---|---|
| Equivalence Ratio | 0.72 | 0.79 |
| Residual, mass % | 52 | 53 |
| NMEP, bar | 1.42 | 1.17 |
| T @ IVC, K | 526 | 555 |
| P @ IVC, bar | 1.07 | 0.88 |
| CA10 (deg, aTDC) | −3.3 | −3.2 |
| CA50 (deg, aTDC) | 4.1 | 4.8 |
| Main Energy Release, J | 187.0 | 152.8 |
| Recompression Energy Release, J | 58.9 | 52.0 |

Referring now to Tables 3 and 4, there are provided modeling results of operating the engine at sea level and at high altitude under high load conditions, nominally about 4.50 bar NMEP at sea level, in accordance with the invention. The operating condition was for operating at stoichiometry, i.e., an equivalence ratio of about 1.0, with a first, reforming injection with an end of injection at 440 degrees before top-dead-center ('deg bTDC'), and split fuel injection including a second injection ending at 330 deg bTDC and a third injection ending at 270 deg bTDC. Table 3 depicts results of operating under the same fueling conditions at low and high altitudes, whereas Table 4 depicts result of operating at low altitude, and at high altitude with reduced fueling during the main, second injection (13 mg fuel). This demonstrates that at high loads in stoich HCCI operation, there is a need to decrease fueling to maintain optimum operation.

TABLE 3

| 14.1 mg/cycle | Sea Level | High Altitude |
|---|---|---|
| Intake Pressure (BARO) | Pin = 0.95 bar | Pin = 0.82 bar |
| Fuel Injection | 0.4 mg/6.7 mg/7 mg | 2.1 mg/5 mg/7 mg |
| NVO (CAD) | NVO = 124 | NVO = 104 |
| Equivalence Ratio | 1.00 | 0.98 |
| EGR, mass % | 26 | 25 |
| NMEP, bar | 4.50 | 4.64 |
| T @ IVC, K | 461 | 434 |
| P @ IVC, bar | 0.94 | 0.80 |
| CA10 (deg, aTDC) | 2.2 | 2.8 |
| CA50 (deg, aTDC) | 5.4 | 5.7 |
| Noise, MW/m2 | 6.0 | 13.3 |

TABLE 4

| | Sea Level | High Altitude |
|---|---|---|
| Intake Pressure (BARO) | Pin = 0.95 bar | Pin = 0.82 bar |
| Fuel Injection | 0.4 mg/6.7 mg/7 mg | 1.9 mg/4.6 mg/6.5 mg |
| NVO (CAD) | NVO = 124 | NVO = 114 |
| Equivalence Ratio | 1.00 | 1.00 |
| EGR, mass % | 26 | 28 |
| NMEP, bar | 4.50 | 4.21 |
| T @ IVC, K | 461 | 443 |
| P @ IVC, bar | 0.94 | 0.81 |
| CA10 (deg, aTDC) | 2.2 | 3.5 |
| CA50 (deg, aTDC) | 5.4 | 7.1 |
| Noise, MW/m2 | 6.0 | 5.0 |

Referring now to Table 5, there are depicted modeling results for operating the engine at higher attitudes, without reforming fuel. These results, in conjunction with results in Table 5, demonstrate a need for operating conditions which address noise constraints and achieve ignitability. Operating conditions include decreasing NVO, increasing reforming fuel or spark-assisted ignition to allow adequate dilution and ignitability of the combustion charge.

TABLE 5

| Intake Pressure (BARO) | Sea Level | High Altitude |
|---|---|---|
| | Pin = 0.95 bar | Pin = 0.75 bar |
| Fuel Injection | 0.4 mg/6.7 mg/7 mg | 7.5 mg/7.5 mg |
| NVO (CAD) | NVO = 124 | NVO = 104 |
| Equivalence Ratio | 1.00 | 1.00 |
| EGR, mass % | 26 | 14 |
| NMEP, bar | 4.50 | 4.82 |
| T @ IVC, K | 461 | 441 |
| P @ IVC, bar | 0.94 | 0.73 |
| CA10 (deg, aTDC) | 2.2 | 0.1 |
| CA50 (deg, aTDC) | 5.4 | 1.8 |
| Noise, MW/m2 | 6 | 73 |

In an alternative embodiment, another valve actuation system is used for this engine to extend the upper load limit for HCCI operation. The alternate valve actuation system comprises a variable lift control device operative to provide a three-step lift capacity and a dual cam phaser system. This three-step valve actuation system is operative at all altitudes and atmospheric pressures. The first, low-lift (3-5 mm lift) step is used in conjunction with a short-duration NVO, and is preferably employed during the lean, unthrottled operation. A second medium-lift (6-8 mm lift) is preferably employed with increased engine load to provide greater exhaust and intake valve lift and duration, and to allow greater mass of air and external EGR to enter the engine. The third, high-lift is employed when operating the engine in conventional spark-ignition mode. At sea level, the second valve lift allows a higher maximum fueling rate in HCCI mode, because more air and dilution enters the chamber than with the lower step of the two-step system. As the altitude is increased or atmospheric pressure decreases, the maximum fueling rate is lowered for the same reasons mentioned for the two-step system, but the maximum fueling rate at a given altitude is higher than for the two-step system.

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method for operating a multi-cylinder, spark-ignition, direct-injection, four-stroke internal-combustion engine adapted to operate in a controlled auto-ignition mode selectively operative at stoichiometry and lean of stoichiometry, the method comprising:
   adapting an engine valve actuation system to control engine valve opening and closing;
   monitoring engine operating conditions;
   monitoring ambient barometric pressure;
   operating the engine unthrottled and controlling the engine valve actuation system to effect a negative valve overlap period when the engine operating conditions are within predetermined ranges;
   injecting a mass of fuel during the negative valve overlap period; and
   selectively decreasing the magnitude of the negative valve overlap period with decreasing ambient barometric pressure and selectively increasing the magnitude of the negative valve overlap period with increasing ambient barometric pressure.

2. The method of claim 1, comprising operating the engine in the controlled auto-ignition mode at stoichiometry when the engine operating conditions comprise high load and the engine is operating at decreased ambient barometric pressure.

3. The method of claim 2, further comprising reducing the predetermined ranges of engine operating conditions for operating the engine unthrottled and controlling the variable valve actuation system in the negative valve overlap period with decreasing ambient barometric pressure.

4. The method of claim 3, wherein the engine operating conditions comprise engine load.

5. The method of claim 3, further comprising maintaining exhaust gas recirculation flow with decreasing ambient barometric pressure.

6. The method of claim 5, wherein the predetermined ranges of engine operating conditions are determined based upon operating the engine in the controlled auto-ignition mode at stoichiometry and maintaining the exhaust gas recirculation flow under high engine load operating conditions across a range of ambient barometric pressures.

7. The method of claim 1, wherein adapting the engine valve actuation system to control engine valve opening and closing comprises adapting the engine valve actuation system to selectively control lift, opening timing, and opening duration of intake and exhaust valves.

8. The method of claim 1, comprising operating the engine in the controlled auto-ignition mode lean of stoichiometry when the engine operating conditions comprise low load.

9. The method of claim 8, further comprising reducing the predetermined ranges of engine operating conditions for operating the engine unthrottled and controlling the variable valve actuation system in the negative valve overlap period with decreasing ambient barometric pressure.

10. The method of claim 1, further comprising decreasing the mass of fuel injected during the negative valve overlap period with the decreasing ambient barometric pressure.

11. The method of claim 1, further comprising:
assisting combustion with controlled spark ignition; and,
adjusting the combustion timing by adjusting the spark ignition timing.

12. The method of claim 11 further comprising operating the engine throttled and operating the engine at stoichiometry when the engine operating conditions are outside the predetermined ranges.

13. The method of claim 1, wherein monitoring ambient barometric pressure comprises monitoring barometric pressure with an on-board sensor.

14. Method for operating a multi-cylinder, spark-ignition, direct-injection, four-stroke internal-combustion engine selectively operative in one of a controlled auto-ignition mode and a spark-ignition mode, comprising:
monitoring engine operating conditions and engine load;
monitoring ambient barometric pressure;
operating the engine in the controlled auto-ignition mode when the engine operating conditions and the engine load are within predetermined ranges;
reducing the predetermined ranges for operating the engine in the controlled auto-ignition combustion mode with decreasing ambient barometric pressure; and,
increasing the predetermined ranges for operating the engine in the controlled auto-ignition mode with increasing ambient barometric pressure.

15. The method of claim 14, wherein operating the engine in the controlled auto-ignition mode comprises:
equipping the engine with a variable valve actuation system selectively controllable in a negative valve overlap condition;
controlling the variable valve actuation system in the negative valve overlap condition;
assisting combustion with controlled spark ignition;
injecting fuel during the negative valve overlap condition; and,
operating the engine in an unthrottled condition.

16. The method of claim 15, further comprising operating the engine lean of stoichiometry and selectively decreasing the mass of fuel injected during the negative valve overlap period with decreasing ambient barometric pressure.

17. The method of claim 16, comprising reducing the predetermined ranges for the engine operating conditions and the engine load for operating the engine unthrottled and controlling the variable valve actuation system in the negative valve overlap period with decreasing ambient barometric pressure.

18. The method of claim 17, further comprising operating the engine at stoichiometry and maintaining mass of recirculated exhaust gas during the negative valve overlap period with the decreasing ambient barometric pressure.

19. Method for operating an internal combustion engine in a controlled auto-ignition combustion mode, said engine comprising a spark-ignition direct-injection four-stroke internal-combustion engine equipped with a valve actuation system operative to control valve lift, valve opening timing, and valve opening duration and selectively operative to effect negative valve overlap, the method comprising:
selectively decreasing a magnitude of negative valve overlap with a decreasing barometric pressure;
selectively decreasing a quantity of fuel injected during the negative valve overlap with the decreasing barometric pressure in a lean auto-ignition combustion operating mode; and,
selectively adjusting the quantity of fuel injected during the negative valve overlap with the decreasing barometric pressure in a stoichiometry auto-ignition combustion operating mode.

20. The method of claim 19, comprising:
establishing predetermined ranges of engine operating conditions for operating the engine in the controlled auto-ignition combustion mode for a predetermined barometric pressure; and
adjusting the predetermined ranges for operating the engine in the controlled auto-ignition combustion mode based upon changes in the barometric pressure.

* * * * *